(No Model.)

J. C. GARROOD.
BEARING FOR VELOCIPEDES.

No. 295,161. Patented Mar. 18, 1884.

WITNESSES
Joseph Ishbaugh
B. W. Williams

INVENTOR
John C. Garrood,
By his Att'y.
Henry W. Williams

United States Patent Office.

JOHN C. GARROOD, OF BOSTON, MASSACHUSETTS.

BEARING FOR VELOCIPEDES.

SPECIFICATION forming part of Letters Patent No. 295,161, dated March 18, 1884.

Application filed December 24, 1883. (No model.)

*To all whom it may concern:*

Be it known that I, JOHN C. GARROOD, a subject of the Queen of Great Britain, residing in Boston, in the county of Suffolk and State of Massachusetts, have invented new and useful Improvements in Ball-Bearings for Bicycles and other Velocipedes, of which the following is a specification.

My improvement relates more particularly to ball-bearings for the rear or trailing wheels of bicycles, although I do not confine myself to such use.

Figure 1:
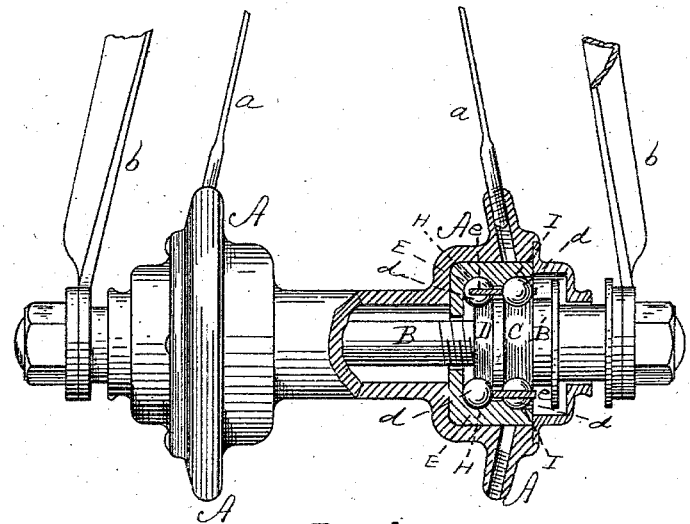
Figure 2:
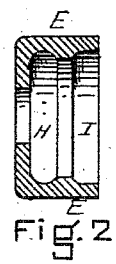

In the accompanying drawings, in which similar letters of reference indicate like parts, Figure 1 is an elevation of the hub of the rear wheel of a bicycle, a portion being broken out so as to show one of the bearings in longitudinal section. Fig. 2 is a sectional view of the box removed.

A is the hub from which extend the spokes *a*, and B is the stationary axle secured rigidly to the rear-wheel fork *b* in the usual manner. Rigidly secured to or made integral with the axle is the portion B', which is provided with the two annular grooves C D. The outer groove, C, is nearly semicircular (describing a half-circle) in cross-section, and the inner groove, D, at the end of the portion B', is nearly quadrantal (describing a quarter-circle) in cross-section.

E is a circular box rigidly secured in the hub A, and provided with the two internal annular grooves H I. The groove H, which is nearly semicircular, is directly opposite the nearly-quadrantal groove D, and the groove I, which is nearly quadrantal, is directly opposite the nearly-semicircular groove C. The usual balls *d* and cages *e* are placed in the grooves, although the cages may be omitted, if desired.

This device forms a very efficient and noiseless double-ball bearing, the novelty in which consists in the peculiar relative arrangement of the grooves, for if the quadrantal grooves were not placed at the ends, thus bringing them opposite the semicircular grooves, the bearing could not be put together.

It is evident that the grooves must fall a little short of being quadrantal and a little short of being semicircular in cross-section; otherwise their edges would touch those of the opposite grooves, defeating the object of the balls, besides making no allowance for wear.

Figure 4:
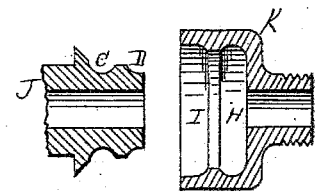
Figure 3:
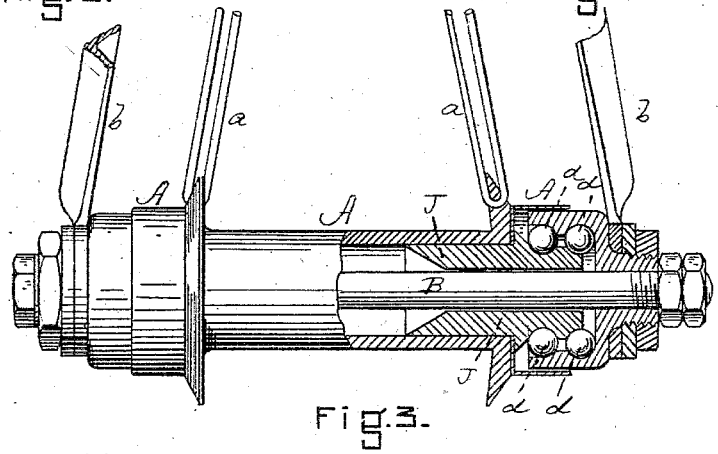

In the modification shown in Figs. 3 and 4, which show, respectively, an elevation and section similar to that shown in Fig. 1, and detached sectional views of the cone and box, the principle is precisely the same; but the cone J, which revolves with the hub A, is provided with the semicircular annular groove C and the quadrantal groove D, and the box K, which is stationary, (being rigid with the fork *b*,) is provided with the semicircular annular internal groove, H, and the quadrantal groove I.

In Figs. 1 and 2 the external portion of the bearing rotates, and in Figs. 3 and 4 the internal portion rotates.

Having thus fully described my invention, what I claim, and desire to secure by Letters Patent, is—

A double-ball bearing for bicycles and other velocipedes, consisting, essentially, of an external annular box or surface provided with two internal annular grooves, H I, the groove H being nearly semicircular in cross-section, and the groove I being an end groove and nearly quadrantal in cross-section, an internal bearing provided with the similar grooves C D, the nearly-semicircular groove C being situated opposite the nearly-quadrantal groove I, and the nearly-quadrantal groove I opposite the nearly-semicircular groove H, and the two rows of balls *d d*, all constructed and arranged substantially as and for the purpose herein set forth.

JOHN C. GARROOD.

Witnesses:
HENRY W. WILLIAMS,
JOSEPH ISHBAUGH.